United States Patent [19]

Darlington et al.

[11] 4,315,805
[45] Feb. 16, 1982

[54] SOLID POLYMER ELECTROLYTE CHLOR-ALKALI PROCESS

[75] Inventors: William B. Darlington, Portland; Donald W. DuBois, Corpus Christi, both of Tex.

[73] Assignee: PPG Industries, Inc., Pittsburgh, Pa.

[21] Appl. No.: 120,217

[22] Filed: Feb. 11, 1980

Related U.S. Application Data

[63] Continuation-in-part of Ser. No. 76,898, Sep. 19, 1979.

[51] Int. Cl.$^3$ .......................... C25F 1/34; C25F 1/04
[52] U.S. Cl. ........................................ 204/98; 204/128; 204/129
[58] Field of Search .................... 204/98, 128, 129

[56] References Cited

U.S. PATENT DOCUMENTS

| | | | |
|---|---|---|---|
| 3,242,059 | 3/1966 | Cottam et al. | 204/98 |
| 4,056,452 | 11/1977 | Campbell | 204/258 |
| 4,057,479 | 11/1977 | Campbell | 204/258 |
| 4,065,366 | 12/1977 | Oda et al. | 204/296 |
| 4,100,050 | 7/1978 | Cook et al. | 204/252 |
| 4,191,618 | 3/1980 | Coker et al. | 204/98 |
| 4,210,501 | 7/1980 | Dempsey et al. | 204/98 |
| 4,214,958 | 7/1980 | Coker et al. | 204/128 |

FOREIGN PATENT DOCUMENTS

| | | | |
|---|---|---|---|
| 872632 | 12/1978 | Belgium | 204/98 |
| 872633 | 12/1978 | Belgium | 204/98 |
| 2007260 | 5/1979 | United Kingdom . | |

*Primary Examiner*—R. L. Andrews
*Attorney, Agent, or Firm*—Richard M. Goldman

[57] ABSTRACT

Disclosed is a solid polymer electrolyte electrolytic cell, e.g., for chlorine production, where the electrodes are in compressive contact with and removable from the permionic membrane. For a preferred exemplification the anode is in compressive contact with and removable from the permionic membrane, and the cathode is bonded to the permionic membrane.

7 Claims, 2 Drawing Figures

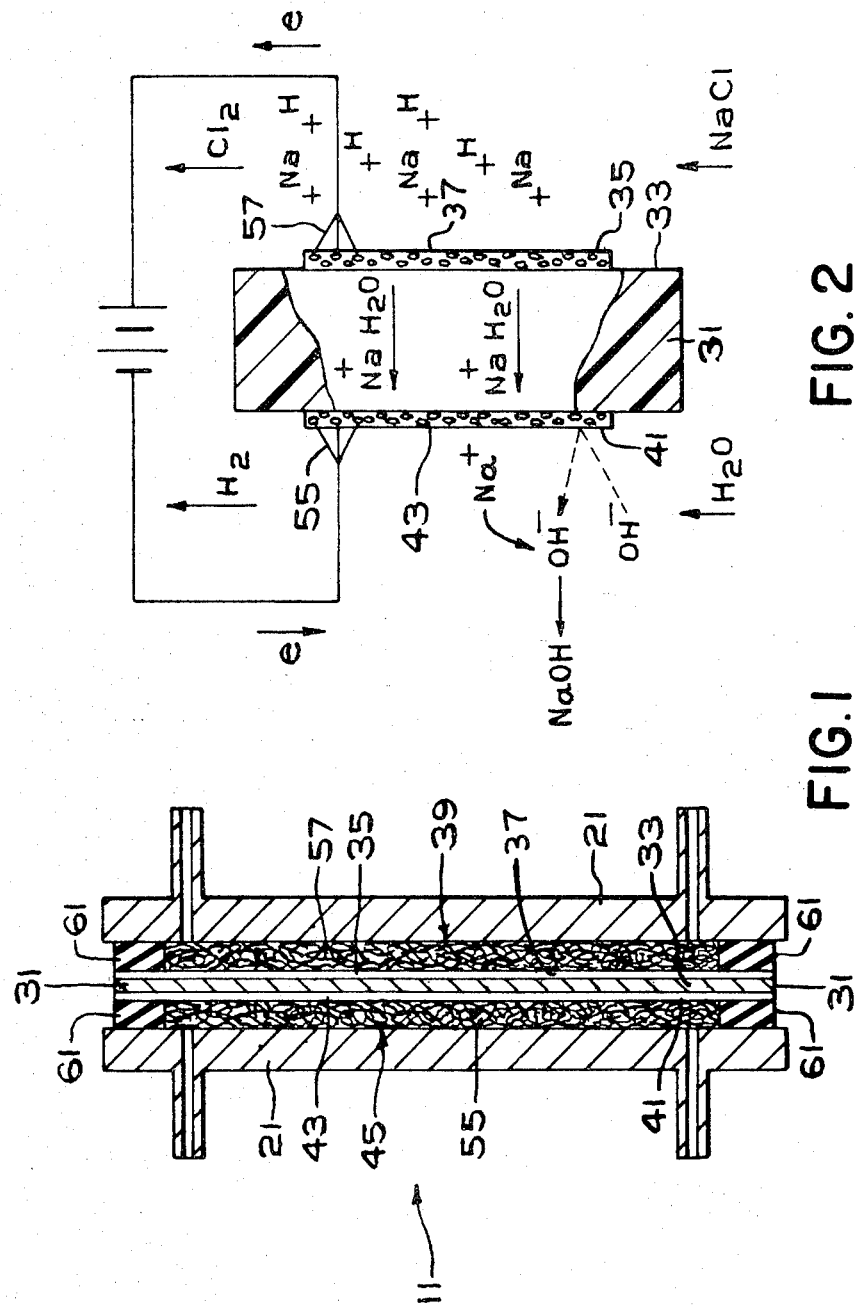

SOLID POLYMER ELECTROLYTE CHLOR-ALKALI PROCESS

CROSS REFERENCE TO RELATED APPLICATION

This is a continuation-in-part of our commonly assigned, copending U.S. Application Ser. No. 76,898 filed Sept. 19, 1979 for SOLID POLYMER ELECTROLYTE CHLOR ALKALI PROCESS AND ELECTROLYTIC CELL.

DESCRIPTION OF THE INVENTION

Solid polymer electrolyte chlor alkali cells have a cation selective permionic membrane with the anodic electrocatalyst either bearing on the anodic surface of the membrane, that is, in contact with but not physically or chemically bonded to the anolyte facing surface of the permionic membrane, or physically or chemically bonded to and embedded in the permionic membrane, and a cathodic hydroxyl evolution catalyst, i.e., a cathodic electrocatalyst, either bearing on the cathodic surface of the membrane, that is, in contact with but not physically or chemically bonded to the catholyte facing surface of the permionic membrane, or physically or chemically bonded to and embedded in the permionic membrane. According to the invention herein contemplated, either the anode or the cathode or both bear upon, but are not embedded in or bonded to, the permionic membrane.

According to a preferred exemplication herein contemplated, there is no liquid gap, that is, no electrolyte gap between the anodic electrocatalyst bearing upon the anodic surface of the permionic membrane, and the membrane, while the cathodic electrocatalyst is bonded to and embedded in the cathodic surface of the permionic surface. In this way, the high current density and low voltage of a solid polymer electrolyte cell are obtained while simple, mechanical current collectors and electrode supports are retained insofar as practicable.

Solid polymer electrolyte chlor alkali electrolyzers herein contemplated retain the expected advantages of solid polymer electrolytes having the electrocatalysts embedded in and bonded to the permionic membrane, i.e., high production per unit volume of cell, high current efficiency, and all at voltages lower than that of a conventional permionic membrane electrolyte cell.

THE FIGURES

FIG. 1 is a schematic cutaway side elevation of the solid polymer electrolyte electrolytic cell.

FIG. 2 is a schematic of the solid polymer electrolyte chlor-alkali process.

DETAILED DESCRIPTION OF THE INVENTION

The chlor alkali cell shown schematically in FIGS. 1 and 2 has a solid polymer electrolyte 31 with a permionic membrane 33 therein. The permionic membrane 33 has an anodic surface 35 with chlorine catalyst 37 bearing thereon and a cathodic surface 41 with cathodic hydroxyl evolution catalyst 43 bonded thereto and embedded therein. Also shown is an external power supply connected to the anodic catalyst 37 by current distributor or catalyst carrier 57 and connected to the cathodic catalyst 43 by current distributor 55.

Brine is fed to the anodic side of the solid polymer electrolyte 31 where it contacts the anodic chlorine evolution catalyst 37 on the anodic surface 35 of the permionic membrane 31.

The alkali metal ion, that is sodium ion or potassium ion, shown in FIG. 2 as sodium ion, and its water of hydration, passes through the permionic membrane 33 to the cathodic side 41 of the permionic membrane 33. Water is fed to the catholyte compartment both externally, and as water of hydration passing through the permionic membrane 31.

The structure for accomplishing this reaction is shown generally in FIG. 1 where electrolytic cell 11 is shown with walls 21 and a permionic membrane 33 and gaskets 61 therebetween. The permionic membrane 33 has an anodic surface 35 with a supported anodic electrocatalyst 37 bearing upon the anodic surface 35, and a cathodic surface 41 with a cathodic electrocatalyst 43 bonded to and embedded in the cathodic surface 41. In an alternative exemplification, a cathode depolarization catalyst, that is an $HO_2^-$ disproportionation catalyst, (not shown) is in the vicinity of the cathodic surface 41 of the membrane 33 whereby to avoid the evolution of hydrogen gas.

Means for conducting electrical current from the walls 21 to the electrocatalysts, 37 and 43 are as shown as current distributor catalyst carrier 57 in the anolyte compartment 39 which conducts current from the wall 21 to the anodic chlorine evolution catalyst 37, and current distributor 55 in the catholyte compartment 45 which conducts current from the wall 21 to the cathodic hydroxyl evolution catalyst 43.

It has now been found that the cell voltage, electrode potential, and electrode current efficiency are functions of the pressure of the electrode material bearing upon the permionic membrane, 33. The voltage initially decreases with increasing pressure, i.e., compression of the membrane 33 between the electrodes 37 and current collector 55. Thereafter, the rate of voltage decrease with increasing pressure diminishes, and ultimately a constant voltage is attained, which voltage is substantially independent of increasing pressure.

The pressure-voltage relationship is a function of the resiliency and elasticity of the current collectors, e.g., the cathode current collector 57, of the electrode substrates, e.g., the anode substrate or catalyst carrier 55, and of the permionic membrane 33, the geometry of the current collectors and the electrode substrates, i.e., open area, the spacing between individual substrate elements, and the size of the individual substrate elements, the internal reinforcement of the permionic membrane, and thickness of the permionic membrane. For any electrode-permionic membrane combination, the determination of a satisfactory pressure, e.g., the pressure at which increasing imposed pressures give no significant decrease in voltage, is a matter of routine experimentation.

For unreinforced Asahi Glass FLEMION carboxylic acid membranes with electrode substrates of 8 to 10 strands of about one millimeter diameter, per inch, the anode substrate being titanium, and the cathode current carrier having about 40 to 60 percent open area and about 200 to 300 openings per square centimeter, the current collector being steel, or nickel and the cathode current collector and anode substrate compressive pressures of at least 1 pound per square inch up to about 20 pounds per square inch yield voltage reductions.

As described above, the solid polymer electrolyte 31 contains a permionic membrane 33. The permionic membrane 33 should be chemically resistant, cation selective, with anodic chlorine evolution catalyst 37 on the anodic surface 35 i.e., bearing on the anodic surface 35, or bonded to and embedded in the anodic surface 35, and cathodic, hydroxyl evolution catalyst 43 on and, preferably embedded in and bonded to the cathodic surface 41 thereof.

The flurocarbon resin permionic membrane 33 used in providing the solid polymer electrolyte 31 is characterized by the presence of cation selective ion exchange groups, the ion exchange capacity of the membrane, the concentration of ion exchange groups in the membrane on the basis of water absorbed in the membrane, and the glass transition temperature of the membrane material.

The flurocarbon resins herein contemplated have the moieties:

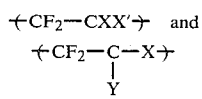

where X is —F, —Cl, —H, or —$CF_3$; X' is —F, —Cl, —H, —$CF_3$ or $CF_3(CF_2)_m$—; m is an integer of 1 to 5; and Y is —A, —$\phi$—A, —P—A, or —O—$(CF_2)_n$ (P, Q, R)—A.

In the unit (P, Q, R), P is —$(CF_2)_a(CXX')_b(CF_2)_c$, Q is $(-CF_2-O-CXX')_d$, R is $(-CXX'-O-CF_2)_e$, and (P, Q, R) contains one or more of P, Q, R, and is a discretionary grouping thereof.

$\phi$ is the phenylene group, n is 0 or 1; a, b, c, d and e are integers from 0 to 6.

The typical groups of Y have the structure with the acid group, A, connected to a carbon atom which is connected to a fluorine atom. These include —$(CF_2)_x$A, and side chains having ether linkages such as: —O—$(CF_2)_x$A,

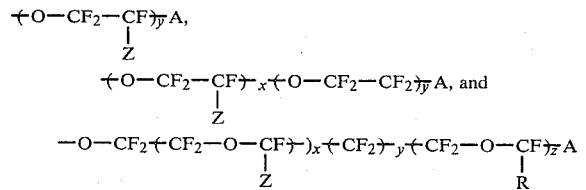

where x, y, and z are respectively 1 to 10; Z and R are respectively —F or a $C_{1-10}$ perfluoroalkyl group, and A is the acid group as defined below.

In the case of copolymers having the olefinic and olefin-acid moieties above described, it is preferable to have 1 to 40 mole percent, and preferably especially 3 to 20 mole percent of the olefin-acid moiety units in order to produce a membrane having an ion-exchange capacity within the desired range.

A is an acid group chosen from the group consisting of
—$SO_3H$
—COOH
—$PO_3H_2$, and
—$PO_2H_2$, or a group which may be converted to one of the aforesaid groups by hydrolysis or by neutralization. Whenever a completed, assembled solid polymer electrolyte installed in an electrolytic cell is referred to as being in the acid form, it is to be understood that the alkali salt form is also contemplated.

In one exemplification A may be either —$SO_3H$ or a functional group which can be converted to —$SO_3H$ by hydrolysis or neutralization, or formed from —$SO_3H$ such as —$SO_3M'$, $(SO_2-NH)$ M'', —$SO_2NH-R_1-NH_2$, or —$SO_2NR_4R_5NR_4R_6$; M' is an alkali metal; M'' is H, $NH_4$, an alkali metal, or an alkaline earth metal; $R_4$ is H, Na or K; $R_5$ is a $C_3$ to $C_6$ alkyl group, $(R_1)_2$ $NR_6$, or $R_1NR_6$ $(R_2)_2$ $NR_6$; $R_6$ is H, Na, K or —$SO_2$; and $R_1$ is a $C_2-C_6$ alkyl group.

In a particularly preferred exemplification of this invention, A may be either —COOH, or a functional group which can be converted to —COOH by hydrolysis or neutralization such as —CN, —COF, —COCl, —$COOR_1$, —COOM, —$CONR_2R_3$; $R_1$ is a $C_{1-10}$ alkyl group and $R_2$ and $R_3$ are either hydrogen or $C_1$ to $C_{10}$ alkyl groups, including perfluoroalkyl groups, or both. M is hydrogen or an alkali metal; when M is an alkali metal it is most preferably sodium or potassium.

Cation selective permionic membranes where A is either —COOH, or a functional group derivable from or convertible to —COOH, e.g., —CN,—COF,COCl, —$COOR_1$, —COOM, or —$CONR_2R_3$, as described above, are especially preferred because of their voltage advantage over sulfonyl membranes. This voltage advantage is on the order of about 0.1 to 0.4 volt at a current density of 150 to 250 amperes per square foot, a brine content of 150 to 300 grams per liter of sodium chloride, and a caustic soda content of 15 to 40 weight percent sodium hydroxide. Additionally, the carboxylic acid type membranes have a current efficiency advantage over sulfonyl type membranes at high anolyte pH values, e.g., above about 4.0 and with anodes having an oxygen evolution overvoltage at least about 0.2 volt above the chlorine evolution overvoltage thereof.

The membrane material herein contemplated has an ion exchange capacity from about 0.5 to about 2.0 milligram equivalents per gram of dry polymer, and preferably from about 0.9 to about 1.8 milligram equivalents per gram of dry polymer, and in a particularly preferred exemplification, from about 1.1 to about 1.7 milligram equivalents per gram of dry polymer. When the ion exchange capacity is less than about 0.5 milligram equivalents per gram of dry polymer the voltage is high at the high concentrations of alkaline metal hydroxide herein contemplated, while when the ion exchange capacity is greater than about 2.0 milligrams equivalents per gram of dry polymer, the current efficiency of the membrane is too low.

The content of ion exchange groups per gram of absorbed water is from about 8 milligram equivalents per gram of absorbed water to about 30 milligram equivalents per gram of absorbed water and preferably from about 10 milligram equivalents per gram of absorbed water to about 28 milligram equivalents per gram of absorbed water, and in a preferred exemplification from about 14 milligram equivalents per gram of absorbed water to about 26 milligram equivalents per gram of absorbed water. When the content of ion exchange groups per unit weight of absorbed water is less than about 8 milligram equivalents per gram or above about 30 milligram equivalents per gram the current efficiency is too low.

The glass transition temperature is preferably at least about 20° C. below the temperature of the electrolyte. When the electrolyte temperature is between about 95° C. and 110° C., the glass transition temperature of the fluorocarbon resin permionic membrane material is below about 90° C., and in a particularly preferred exemplification, below about 70° C. However, the glass transition temperature should be above about −80° C. in order to provide satisfactory tensile strength of the membrane material. Preferably the glass transition temperature is from about −80° C. to about 70° C. and in a particularly preferred exemplification from about minus 80° C. to about 50° C.

When the glass transition temperature of the membrane is within about 20° C. of the electrolyte or higher than the temperature of the electrolyte, the resistance of the membrane increases and the permselectivity of the membrane decreases. By glass transition temperature is meant the temperature below which the polymer segments are not energetic enough to either move past one another or with respect to one another by segmental Brownian motion. That is, below the glass transition temperature, the only reversible response of the polymer to stresses is strain, while above the glass transition temperature the response of the polymer to stress is segmental rearrangement to relieve the externally applied stress.

The fluorocarbon resin permionic membrane materials contemplated herein have a water permeability of less than about 100 milliliters per hour per square meter at 60° C. in four normal sodium chloride at a pH of 10 and preferably lower than 10 milliliters per hour per square meter at 60° C. in four normal sodium chloride of the pH of 10. Water permiabilities higher than about 100 milliliters per hour per square meter, measured as described above, may result in an impure alkali metal hydroxide product.

The electrical resistance of the dry membrane should be from about 0.5 to about 10 ohms per square centimeter and preferably from about 0.5 to about 7 ohms per square centimeter.

Preferably the fluorinated-resin permionic membrane has a molecular weight, i.e., a degree of polymerization, sufficient to give a volumetric flow rate of about 100 cubic millimeters per second at a temperature of from about 150° to about 300° C.

The thickness of the permionic membrane 33 should be such as to provide a membrane 33 that is strong enough to withstand pressure transients and manufacturing processes, but thin enough to avoid high electrical resistivity. Preferably the membrane is from 10 to 1000 microns thick and in a preferred exemplification from about 50 to about 400 microns thick. Additionally, internal reinforcement, or increased thickness, or cross-linking, or even lamination may be utilized whereby to provide a strong membrane.

The catalyst particles, i.e., either the anodic electrocatalyst bearing on the surface of the permionic membrane 33 and supported on the substrate, or the cathodic electrocatalyst bonded to and embedded in the permionic membrane 33, as described above, may be graphite, a precious metal-containing catalyst, such as a platinum group metal or alloy of a platinum group metal or an intermetallic compound of a platinum group metal or an oxide, carbide, nitride, boride, silicide, or sulphide of a platinum group metal, a transition metal, or a compound of a transition metal. Suitable compounds of transition metals include pyrochlores, delafossites, spinels, perovskites, bronzes, tungsten bronzes, silicides, nitrides, carbides, and borides.

Especially desirable cathodic catalysts which may bear upon or be bonded to and embedded in the solid polymer electrolyte permionic membrane 33 or, in a preferred exemplification be embedded therein and bonded thereto include steel, stainless steel, cobalt, nickel, alloys of nickel or iron, compositions of nickel, especially porous nickel with molybdenum, tantalum, tungsten, titanium, columbium or the like, and borides, electrically conductive, catalytically active borides, nitrides, silicides and carbides, such as, the platinum group metal silicides, nitrides, carbides and borides and titanium diboride.

The cathode electrocatalyst particles bonded to and embedded in the permionic membrane 33 may be embedded in a thermoplastic deformate of the permionic membrane. That is, the permionic membrane 33 may be in a thermoplastic form, e.g., a carboxylic acid, a low alkyl ester of a carboxylic acid, an acid chloride of a carboxylic acid, or an acid chloride of a sulfonic acid, and the cathode electrocatalyst particles caused to adhere thereto by the application of heat and pressure. Thereafter, the thermoplastic form of the ion exchange resin material is hydrolyzed to an infusible alkali metal salt form, e.g., by installation in a chlor-alkali cell. The preparation of a solid polymer electrolyte having electrocatalyst deposed in, embedded in, and bonded a thermoplastic deformate thereof is described commonly assigned, copending applications of Preston S. White for SOLID POLYMER ELECTROLYTE AND METHOD OF PREPARING SAME, Ser. No. 105,055 filed Dec. 19, 1979, and Ser. No. 120,247, a continuation-in-part thereof, filed of even date with our application the disclosures of both of which are incorporated herein by reference.

The current density of the solid polymer electrolyte electrolytic cell may be higher than that in a conventional permionic membrane or diaphragm cell, for example, in excess of 200 amperes per square foot, and preferably in excess of 400 amperes per square foot. According to one preferred exemplification of this invention, electrolysis may be carried out at a current density of 800 or even 1,200 amperes per square foot, where the current density is defined as total current passing through the cell divided by the surface area of one side of the permionic membrane 33.

In order to attain the high current densities herein contemplated, a uniform current distribution across the face of the permionic membrane 33 is desirable. This may be accomplished by utilizing electrode substrates, e.g., for the anode, and the current collectors, e.g. for the cathode, having a high percentage of open area, e.g., above about 40 to 60 percent open area, and a narrow pitch, e.g., about 0.5 to 2 millimeters between substrate elements. A suitable substrate is mesh or screen having 10 to 30 or more strands per inch, where the strands are from about 0.5 to about 2.5 millimeters apart, centerline to centerline, and a diameter such as to provide at least about 40, and preferably above about 60 percent open area and from about 75 to about 400 openings per square centimeter. The mesh or screen is fabricated of a material that is resistant to the electrolyte and electrically conductive, and has an electro-catalytic surface thereon. Alternatively, the electrode support may be a coated sheet or plate, having perforations on a pitch of 0.5 to 1.5 millimeters, and at least about 40 to 60 percent open area.

According to a particularly preferred exemplification of this invention a cathode-permionic membrane unit is prepared by depositing from about 0.01 to about 0.1 grams per square centimeter of platinum black on one side of a 100 to 400 micron thick permionic membrane. The permionic membrane is a copolymer of $CF_2=CF_2$ and a perfluorinated vinyl ether having pendant carboxylic acid methyl ester groups. The platinum black is hot pressed into the permionic membrane at a temperature sufficient to render the permionic membrane thermoplastic, i.e., above about 150° C., and preferably about 200° C., a pressure sufficient to deform the thermoplastic membrane, i.e., above about 200 pounds per square inch, and for a time sufficient to embed the catalyst particles therein and bond the catalyst particles thereto, e.g., for about 1 to 20 minutes.

Thereafter the permionic membrane, now having cathodic electrocatalyst bonded thereto and embedded therein, is installed in an electrolytic cell, between an anodic catalyst carrier and a cathodic current collector. The anodic catalyst carrier has anodic electrocatalyst bonded thereto, e.g., $RuO_2$-$TiO_2$ bonded to a titanium substrate. The cathodic current collector is a steel, stainless steel, nickel, or copper screen, bearing on the cathodic surface of the permionic membrane.

Both the cathode current collector and the anode catalyst carrier are fine mesh, having 600 to 2600 openings per square inch (75 to 400 openings per square centimeter), and at least 40 percent open area.

The cathode electrocatalyst bearing permionic membrane is compressed between the cathode current collector and the anode catalyst carrier, e.g., at a pressure of about 1 pound per square inch to about 20 pounds per square inch.

Thereafter electrolysis is commenced, whereby to yield a caustic soda strength of about 30 to 40 weight percent.

EXAMPLE

A solid polymer electrolyte chlor-alkali cell was prepared having the cathode electrocatalyst bonded to and embedded in a thermoplastic deformate of the permionic membrane, and an anode electrocatalyst coated screen bearing on the opposite side of the permionic membrane.

The solid polymer electrolyte was prepared by depositing 1.5 grams of platinum black on a 3 inch by 3 inch area on one side of a 5 inch by 5 inch by 300 micron (12.6 centimeter by 12.6 centimeter by 300 micron) sheet of an Asahi Glass Co. Flemion perfluorinated carboxylic acid permionic membrane in the methyl ester form. This was hot pressed at 200° C. at 400 to 600 pounds per square inch for eight minutes. The membrane was removed from the hot plate and boiled in 30 percent aqueous NaOH for 24 hours.

The membrane was installed in a laboratory solid polymer electrolyte electrolytic cell with a nickel-plated stainless steel screen as a cathode current collector bearing on the platinum black-coated surface and a ruthenium dioxide-titanium dioxide coated screen as an anodic catalyst carrier bearing on the uncoated surface. Both screens were expanded mesh having openings measuring 0.050 inch center to center long way of the diamond, 0.026 to 0.030 inch center to center short way of the diamond, and having approximately 1400 openings per square inch.

Sodium chloride brine was fed to the anolyte compartment of the cell, and caustic soda was fed initially to the catholyte compartment of the cell, with water being fed subsequently. The initial cell voltage was 3.08 volts at 190 amperes per square foot, dropping to 3.03 volts after 50 minutes of electrolysis.

While the method and apparatus of this invention have been described with reference to specific exemplifications, embodiments, and examples, the scope is not to be limited except as by the claims appended hereto.

We claim:

1. In a method of electrolyzing alkali metal chloride brine to form chlorine and alkali metal hydroxide, which method comprises feeding the brine to an electrolytic cell having an anode comprising anodic electrocatalyst separated from a cathode comprising cathodic electrocatalyst by a permionic membrane, said anodic electrocatalyst and said cathodic electrocatalyst both contacting said permionic membrane, and passing an electrical current from said anodic electrocatalyst to said cathodic electrocatalyst whereby to evolve chlorine at the anode and hydrogen and alkali metal hydroxide at the cathode, the improvement wherein said anode comprises a pervious substrate having anodic electrocatalyst bonded thereto and bearing upon the permionic membrane, said cathodic electrocatalyst is bonded to and embedded in the permionic membrane, and the permionic membrane is a perfluorocarbon having functional groups chosen from the group consisting of —COOH, —CN$_2$COF, —COCl, —COOR$_1$, —COOM, and CONR$_2$R$_3$, where R$_1$ is a C$_1$-C$_{10}$ alkyl group, R$_2$ and R$_3$ are chosen from the group consisting of hydrogen and C$_1$-C$_{10}$ alkyl groups and M is chosen from the group consisting of hydrogen, Na, and K.

2. The method of claim 1 wherein the cathode is bonded to and embedded in a thermoplastic deformate of the permionic membrane.

3. The method of claim 1 wherein the permionic membrane is compressed between 1 and 20 pounds per square inch.

4. The method of claim 1 wherein the permionic membrane is a fluorocarbon resin having the moieties

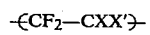

and

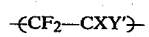

where:
X is chosen from the group consisting of —F, —Cl, —H, and —CF$_3$;
X' is chosen from the group consisting of —F, —Cl, —H, —CF$_3$, and (CF$_2$)$_m$CF, where m is an integer from 1 to 5;
Y is chosen from the group consisting of —A, —$\phi$A, —P—A, and —O—(CF$_2$)$_n$—(P, Q, R)—A, where P is (—CF$_2$) (CXX')$_b$ (CF$_2$)$_c$, Q is (—CF$_2$—O—CXX')$_d$ and R is (—CXX'—O—CF$_2$)$_e$, (P,Q,R) is or contains one or more of P, Q, and R, or is 0 or 1; a,b,c,d, and e are integers from 0 to 6;
$\phi$ is a phenylene group and A is chosen from the group consisting of —COOH,—CN,—COF,—COCl,—COOR,—COOM, and —CONR$_2$R$_3$, where R$_1$ is a C$_1$ to C$_{10}$ alkyl group, and R$_2$ and R$_3$ are chosen from the group consisting of —H, and C$_1$ to C$_{10}$ alkyl groups; and m is chosen from the group consisting of —H and alkali metals.

5. The method of claim 4 wherein Y is chosen from the group consisting of —(CF$_2$)$_x$A, —O—(CF$_2$)$_x$A, —O—(CF$_2$)$_x$A, —(OCF$_2$CFZ)$_y$A, —(OCF$_2$CFZ)$_x$—(OCF$_2$CF$_2$)—A, and —O—CF$_2$—(CF$_2$OCFZ)$_y$—(CF$_2$)$_y$—(CF$_2$OCFR)$_z$ where x, y, and z are 1 to 10, and z and R are chosen from the group consisting of —F and C$_1$ to C$_{10}$ alkyl groups.

6. The method of claim 1 wherein the permionic membrane is compressed sufficiently to reduce the cell voltage relative to an uncompressed permionic membrane.

7. The method of claim 1 wherein the permionic membrane has a substantially uniform current distribution across the face thereof.

* * * * *